US008121181B2

(12) United States Patent
Lin et al.

(10) Patent No.: US 8,121,181 B2
(45) Date of Patent: Feb. 21, 2012

(54) METHOD FOR DETERMINING TARGET TYPE OF CONTROL SIGNALS IN MULTI-CHANNEL SYSTEM

(75) Inventors: Tzuo-Bo Lin, Taipei (TW); Hong-Ta Liu, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 936 days.

(21) Appl. No.: 12/129,687

(22) Filed: May 30, 2008

(65) Prior Publication Data

US 2008/0298499 A1 Dec. 4, 2008

(30) Foreign Application Priority Data

Jun. 4, 2007 (TW) .............................. 96119950 A

(51) Int. Cl.
*H04B 3/46* (2006.01)

(52) U.S. Cl. ...................................................... 375/224

(58) Field of Classification Search .................. 375/224, 375/295, 340; 455/161.2, 434, 429
See application file for complete search history.

(56) References Cited

U.S. PATENT DOCUMENTS 5,524,280 A * 6/1996 Douthitt et al. ................ 455/62
6,229,842 B1 5/2001 Schulist
6,847,676 B1 1/2005 Ng
6,987,795 B1 1/2006 Strutt
7,072,618 B1 7/2006 Strutt

FOREIGN PATENT DOCUMENTS

EP 0 924 890 A2 6/1999
TW I238628 8/2005

* cited by examiner

*Primary Examiner* — Khai Tran
(74) *Attorney, Agent, or Firm* — Winston Hsu; Scott Margo

(57) ABSTRACT

The present invention discloses a method for determining a target type of a plurality of control signals respectively transmitted via a plurality of channels in a multi-channel system. The method includes: receiving a plurality of first control signals simultaneously from the channels during a first time period; determining a control signal priority corresponding to the first time period according to a target type determined by actual types of a plurality of second control signals respectively transmitted via the channels during a second time period, wherein the second time period is prior to the first time period; and determining the target type of the first control signals according to the control signal priority and actual types of the first control signals.

27 Claims, 5 Drawing Sheets

| | T0 | T1 | T2 | T3 | T4 | T5 | T6 | T7 | T8 | T9 |
|---|---|---|---|---|---|---|---|---|---|---|
| Channel 0 | S1 | S2 | S3 | S4 | S5 | S6 | S7 | S8 | S9 | S10 |
| Value | +1 | +2 | +3 | +4 | +5 | +6 | +7 | +8 | +9 | +10 |
| Channel 1 | S1 | S11 | S3 | S4 | S13 | S6 | S7 | S8 | S9 | S19 |
| Value | +1 | +1 | +2 | +3 | +3 | +4 | +5 | +6 | +7 | +7 |
| Channel 2 | S1 | S2 | S12 | S4 | S14 | S15 | S7 | S17 | S9 | S19 |
| Value | +1 | +2 | +2 | +3 | +3 | +3 | +4 | +4 | +5 | +5 |
| Channel 3 | S1 | S2 | S3 | S4 | S5 | S6 | S16 | S8 | S18 | S10 |
| Value | +1 | +2 | +3 | +4 | +5 | +6 | +6 | +7 | +7 | +8 |
| Target type | S1 | S2 | S3 | S4 | S5 | S6 | S7 | S8 | S9 | S10 |

Fig. 4

METHOD FOR DETERMINING TARGET TYPE OF CONTROL SIGNALS IN MULTI-CHANNEL SYSTEM

BACKGROUND OF THE INVENTION

1. Field of the Invention

The present invention relates to a method for determining a target type of a control signal in a data transmission system, and more particularly, to a method for determining a target type of a plurality of control signals respectively transmitted via a plurality of channels in a multi-channel system.

2. Description of the Prior Art

In general, modern data transmission systems usually choose to use multi-channel transmission scheme in order to increase transmission amount per unit time. The multi-channel system for data transmission commonly adds synchronization signals or other specific control signals in a certain time period to let receiving terminals of the multi-channel system to be aligned with each other so as to correctly read the data transmitted via a plurality of channels. However, there may be errors occurring in the above-mentioned synchronization signals or other specific control signals under a condition of bad transmission quality, and it will possibly result in mistakes in the following data reading process if no error correcting process is performed. In general, a concept of "decision by majority" will be applied to the above multi-channel system, that is, when there is a certain control signal with the largest amount of a specific type in the plurality of channels of the multi-channel system during a specific time period, then said control signal with the largest amount of the specific type will be determined to be the correct control signal that the multi-channel system wants to adopt.

Nevertheless, if there are more than two different types of the control signals with the same amount in the same time period, then the conventional multi-channel system will commonly use a fixed (defined in advance) priority to determine which type of control signal should be adopted for this condition. The conventional multi-channel system that utilizes the method of using the fixed priority to select the control signal may possibly select a control signal that is not proper for a certain time period under the condition without considering the different time periods. Thus, the system robustness or consistency of the conventional multi-channel system will be degraded.

SUMMARY OF THE INVENTION

It is therefore one of the objectives of the present invention to provide a method of using data arrangement characteristics of a multi-channel system to determine a control signal priority of various types of control signals when the multi-channel system operates during different time periods so as to determine a target type of the control signal that the multi-channel system wants to adopt during the different time periods.

In accordance with an embodiment of the present invention, a method for determining a target type of a plurality of control signals respectively transmitted via a plurality of channels in a multi-channel system is disclosed. The method includes: receiving a plurality of first control signals from the channels during a first time period; determining a control signal priority corresponding to the first time period according to a target type determined by actual types of a plurality of second control signals respectively transmitted via the channels during a second time period, wherein the second time period is prior to the first time period; and determining the target type of the first control signals according to the control signal priority and actual types of the first control signals.

In accordance with an embodiment of the present invention, a method for determining a target type of a plurality of control signals respectively transmitted via a plurality of channels in a multi-channel system is further disclosed. The method includes: evaluating accuracy of the channels according to an operation process of the multi-channel system so as to generate a plurality of evaluating results corresponding to the accuracy of the channels; receiving a plurality of first control signals simultaneously from the channels during a specific time period; and determining the target type of the first control signals according to the evaluating results and actual types of the first control signals.

In accordance with an embodiment of the present invention, a method for determining a target type of a plurality of control signals transmitted in a multi-channel system is yet further disclosed, wherein the multi-channel system includes a plurality of channels. The method includes: evaluating accuracy of the channels according to a predetermined evaluating scheme so as to generate a plurality of evaluating results corresponding to the accuracy of the channels; receiving a plurality of first control signals simultaneously from the channels during a first time period; and determining the target type of the first control signals according to the evaluating results and actual types of the first control signals.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a simplified diagram illustrating a method for evaluating accuracy of a plurality of channels respectively in the Display Port system according to an operation process of the Display Port system.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not differ in function. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

The present invention relates to a method of using data arrangement characteristics of a multi-channel system to determine a control signal priority of various types of control signals when the multi-channel system operates during different time periods so as to determine a target type of the control signal that the multi-channel system wants to adopt during the different time periods, and this document will describe several exemplary embodiments that apply the method of the present invention. However, a person of average skill in the pertinent art should understand that the present invention can be applied to various types of multi-channel systems and is not limited to the particular embodiments described in the following paragraphs or to the particular manner in which any features of such embodiments are implemented.

In general, the method of the present invention can be applied to all kinds of multi-channel systems. For example, the method of the present invention can be applied to the multi-channel systems for image data transmission, such as a Display Port system, and the method of the present invention also can be applied to the multi-channel systems for Internet data transmission or the multi-channel systems for audio data transmission, etc. A method applied to the Display Port system is disclosed in this document. However, this is only for illustrative purposes and is not meant to be a limitation of the present invention. In addition, under conditions of not affecting the technical disclosure of the present invention, the Display Port system with four channels will be used in this document as an example to illustrate the operation principles of the method according to the present invention.

Figure 1:
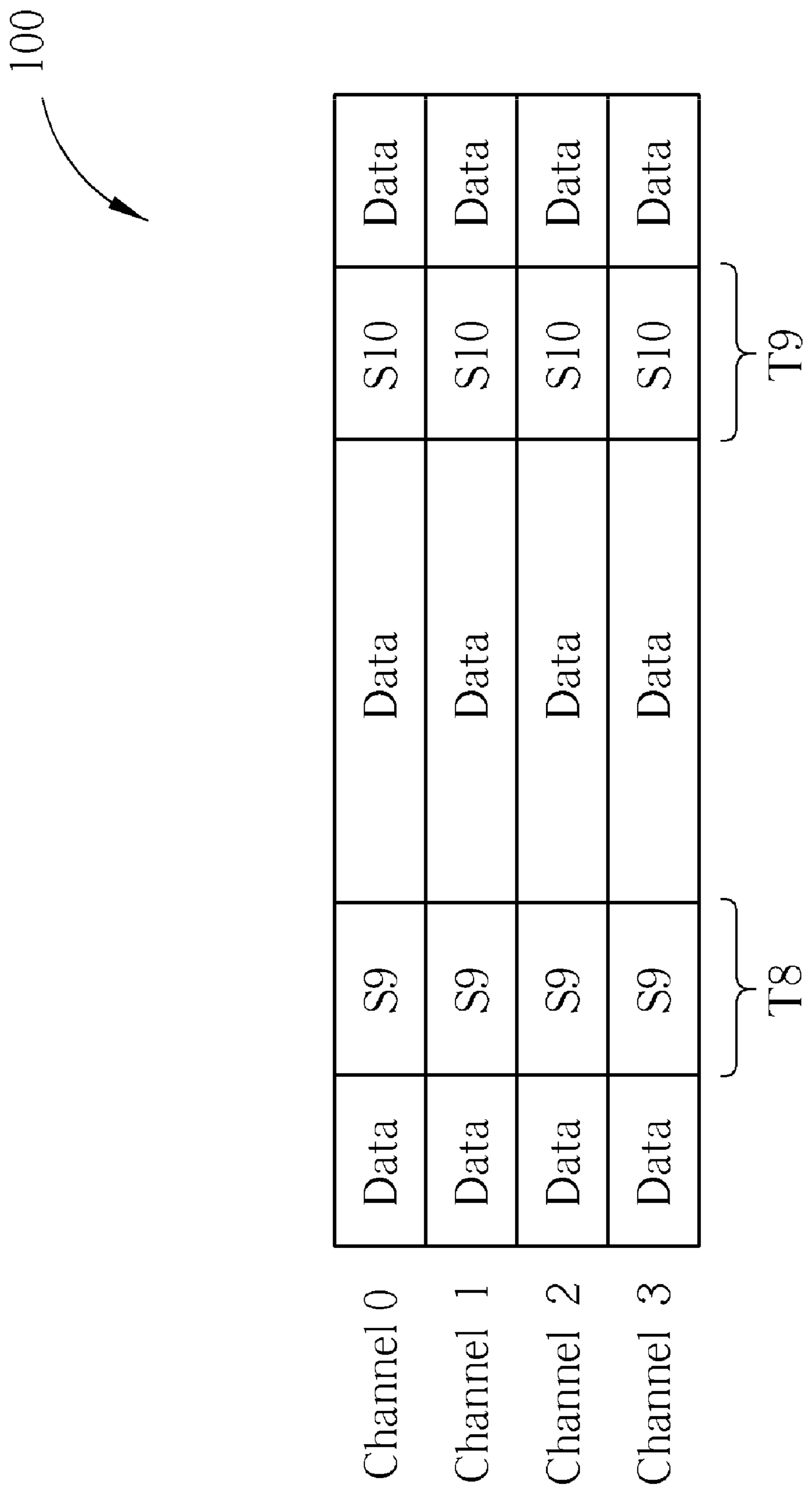
FIG. 1 shows a simplified diagram of a Display Port system receiving various types of control signals in accordance with an embodiment of the present invention.

Please refer to FIG. 1. FIG. 1 shows a simplified diagram of a Display Port system 100 receiving various types of control signals in accordance with an embodiment of the present invention. As shown in FIG. 1, the Display Port system 100 includes four channels: a channel 0, a channel 1, a channel 2, and a channel 3. In general, after the Display Port system 100 finishes a de-skew operation, the signals received in the receiving terminals (not shown) of the Display Port system 100 should be shown as control signals S9 and S10 shown in FIG. 1, where the control signals S9 during the time period T8 are aligned with each other and the control signals S10 during the time period T9 are also aligned with each other, and there are the same type of the control signals in the channel 0, the channel 1, the channel 2, and the channel 3 during the same time period. In this way, then the receiving terminals of the Display Port system 100 can read the data transmitted via the channel 0, the channel 1, the channel 2, and the channel 3 correctly.

However, there may be a condition of bad transmission quality occurring in the above embodiment. For example, when a detecting unit (not shown) of the receiving terminals of the Display Port system 100 detects that the control signals of the channel 0, the channel 1, and the channel 2 during the time period T8 are S9 and the control signal of the channel 3 during the time period T8 is S18, then the method of the present invention will let the Display Port system 100 to select the control signal S9 to simultaneously be the target type of the control signals respectively received via the channel 0, the channel 1, the channel 2, and the channel 3 during the time period T8. In addition, when the detecting unit of the Display Port system 100 detects that the control signals of the channel 1 and the channel 2 during the time period T9 are S19 and the control signal of the channel 0 and the channel 3 during the time period T9 is S10, then the target type of the control signals respectively received via the channel 0, the channel 1, the channel 2, and the channel 3 during the time period T9 is not able to be determined by only comparing the amount of the different types of the control signals (i.e. a scheme of "decision by majority") since the amount of the control signal S19 is equal to the amount of the control signal S10 in these four channels (i.e. the detecting unit respectively detects one type of control signal in two channels of these four channels and another type of control signal in the other two channels of these four channels). Thus, in this embodiment, the method of the present invention will determine a control signal priority corresponding to the channel 0, the channel 1, the channel 2, and the channel 3 during the time period T9 according to a target type (i.e. the control signal S9) determined by actual types of a plurality of control signals respectively received via the channel 0, the channel 1, the channel 2, and the channel 3 during the time period T8 (i.e. respectively the control signal S9, the control signal S9, the control signal S9, and the control signal S18) at first, and then determine the target type of the control signals respectively received via the channel 0, the channel 1, the channel 2, and the channel 3 during the time period T9 according to the control signal priority and the actual types of the control signals respectively received via the channel 0, the channel 1, the channel 2, and the channel 3 during the time period T9 (i.e. respectively the control signal S10, the control signal S19, the control signal S19, and the control signal S10). Please note that the control signal priority is determined according to the data arrangement characteristics of the Display Port system itself, and the specific content of this part will be illustrated in detail in the following paragraphs.

In an exemplary embodiment, when the receiving terminals of the Display Port system 100 operates in a default mode, and the target type (i.e. the control signal S9) determined by the actual types of the control signals respectively received via the channel 0, the channel 1, the channel 2, and the channel 3 during the time period T8 (i.e. respectively the control signal S9, the control signal S9, the control signal S9, and the control signal S18) is a blanking area start (BS) control signal, a secondary data packet end (SE) control signal, a scrambler reset (SR) control signal, a content protection blanking area start (CPBS) control signal, or a content protection scrambler reset (CPSR) control signal, then a secondary data packet start (SS) control signal and a blanking area end (BE) control signal will respectively have a higher priority than the other types of control signals in the control signal priority mentioned above. For example, when the control signal S9 is the above CPSR control signal, and the control signal S10 and the control signal S19 are respectively the SS control signal and the CPBS control signal mentioned above, then the method of the present invention will select the control signal S10 to be the target type of the control signals respectively received via the channel 0, the channel 1, the channel 2, and the channel 3 during the time period T9 since the SS control signal has a higher priority than the CPBS control signal.

In addition, in this embodiment, when the control signal S9 is a BE control signal or a fill end (FE) control signal, then a BS control signal, a fill start (FS) control signal, the FE control signal, an SR control signal, a CPBS control signal, and a CPSR control signal will respectively have a higher priority than the other types of control signals in the control signal priority. When the control signal S9 is an FS control signal, then an FE control signal will have a higher priority than the other types of control signals in the control signal priority. When the control signal S9 is an SS control signal, then the SS control signal and an SE control signal will respectively have a higher priority than the other types of control signals in the control signal priority.

In another embodiment, when the receiving terminals of the Display Port system 100 operates in a enhanced mode, and the target type (i.e. the control signal S9) determined by the actual types of the control signals respectively received via the channel 0, the channel 1, the channel 2, and the channel 3 during the time period T8 (i.e. respectively the control signal S9, the control signal S9, the control signal S9, and the control signal S18) is a BS control signal, then a CPSR control signal, an SS control signal, and a BE control signal will respectively have a higher priority than the other types of control signals in the control signal priority mentioned above. When the control signal S9 is a BE control signal or an FE control signal, then a BS control signal, a FS control signal, the FE control signal, and an SR control signal will respectively have a higher priority than the other types of control signals in the control signal priority. When the control signal S9 is an FS control signal, then an FE control signal has a higher priority than the other types of control signals in the control signal priority. When the control signal S9 is an SS control signal, then the SS control signal and an SE control signal will respectively have a higher priority than the other types of control signals in the control signal priority. When the control signal S9 is an SE control signal, then an SS control signal and a BE control signal will respectively have a higher priority than the other types of control signals in the control signal priority. When the control signal S9 is an SR control signal, then a CPSR control signal, a CPBS control signal, an SS control signal, and a BE control signal will respectively have a higher priority than the other types of control signals in the control signal priority. When the control signal S9 is a CPBS control signal, then a BS control signal, an SR control signal, and the CPBS control signal will respectively have a higher priority than the other types of control signals in the control signal priority. When the control signal S9 is a CPSR control signal, then a BS control signal, an SR control signal, and the CPSR control signal will respectively have a higher priority than the other types of control signals in the control signal priority.

Figure 3:
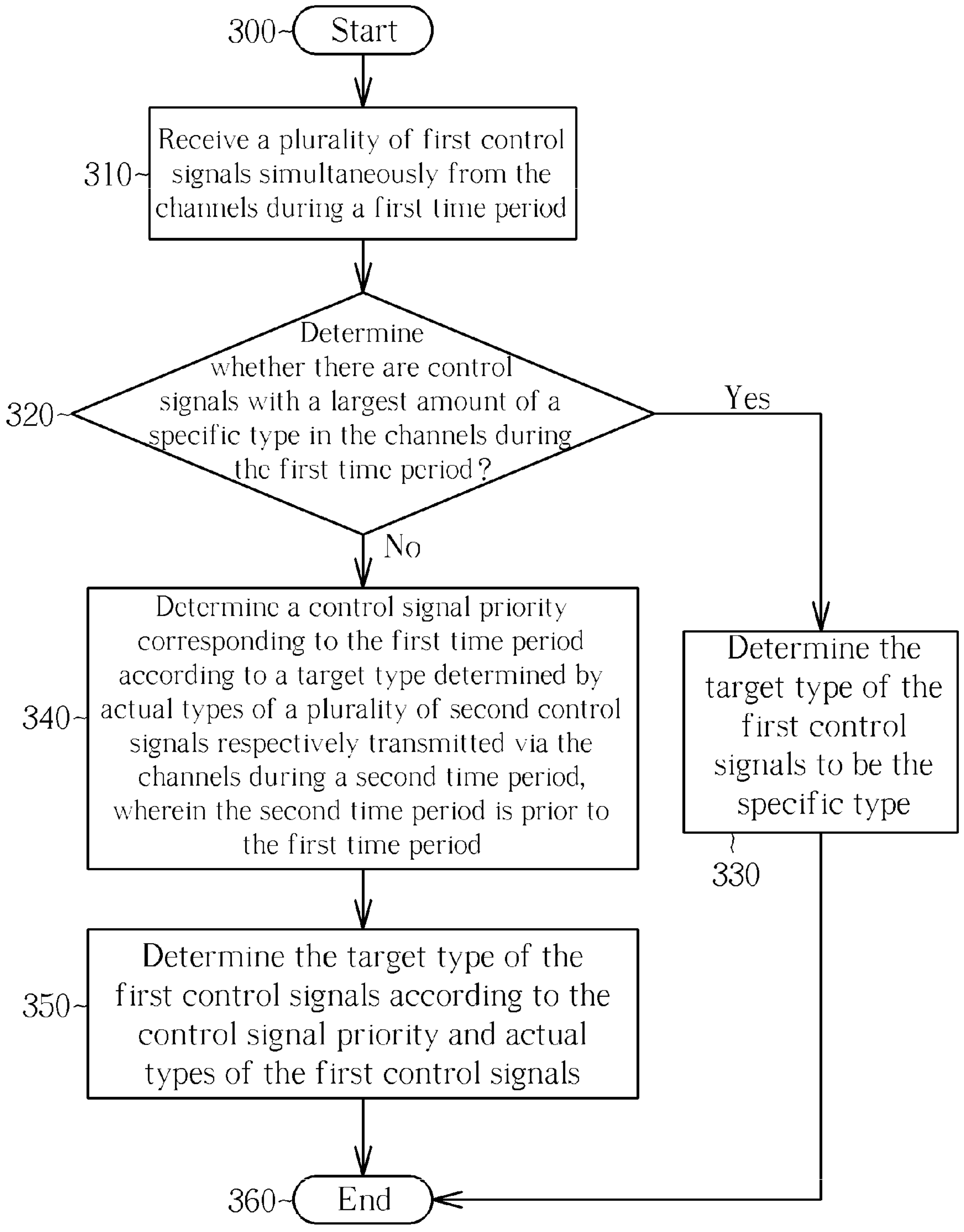
FIG. 3 is a flowchart showing a first embodiment of a method for determining a target type of a plurality of control signals respectively transmitted via a plurality of channels in a multi-channel system according to the operation scheme in the embodiment of the present invention.

Please refer to FIG. 3. FIG. 3 is a flowchart showing a first embodiment of a method for determining a target type of a plurality of control signals respectively transmitted via a plurality of channels in a multi-channel system according to the operation scheme in the above embodiment of the present invention. Provided that substantially the same result is achieved, the steps of the process flowchart need not be in the exact order shown and need not be contiguous, that is, other steps can be intermediate. The first embodiment of the method according to the present invention includes the following steps:

Step 300: Start.

Figure 2:
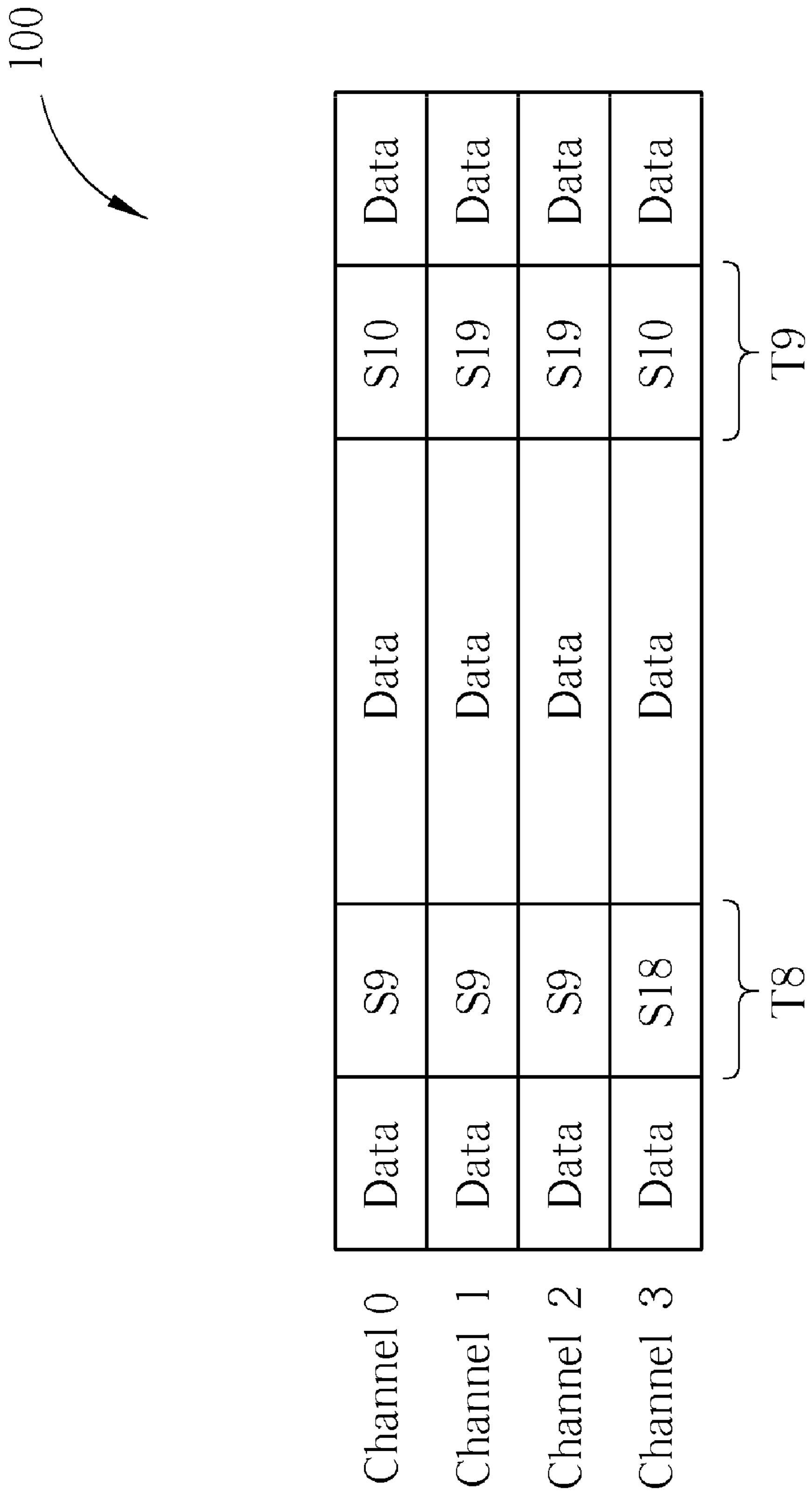
FIG. 2 shows a simplified diagram of a method for determining a target type of a plurality of control signals respectively transmitted via a plurality of channels in a multi-channel system according to the present invention.

Step 310: Receive a plurality of first control signals simultaneously from the channels during a first time period (such as the time period T9 shown in FIG. 2).

Step 320: Determine whether there are control signals with a largest amount of a specific type in the channels during the first time period. If there are the control signals with the largest amount of the specific type in the channels, then go to step 330; otherwise, go to step 340.

Step 330: Determine the target type of the first control signals to be the specific type.

Step 340: Determine a control signal priority corresponding to the first time period according to a target type determined by actual types of a plurality of second control signals respectively transmitted via the channels during a second time period (such as the time period T8 shown in FIG. 2), wherein the second time period is prior to the first time period.

Step 350: Determine the target type of the first control signals according to the control signal priority and actual types of the first control signals.

Step 360: End.

In addition, when the control signal S10 and the control signal S19 have the same control signal priority (for example, when the Display Port system 100 operates in a enhanced mode and the control signal S9 is a BE control signal or an FE control signal, the control signal S10 is a BS control signal and the control signal S19 is an FS control signal), the method of the present invention can further evaluate accuracy of the channel 0, the channel 1, the channel 2, and the channel 3 respectively in the Display Port system 100 according to an operation process of the Display Port system 100 so as to generate a plurality of evaluating results corresponding to the accuracy of the channel 0, the channel 1, the channel 2, and the channel 3 respectively in the Display Port system 100, and then determine the target type of the control signals respectively received via the channel 0, the channel 1, the channel 2, and the channel 3 during the time period T9 according to the evaluating results and the actual types of the control signals respectively received via the channel 0, the channel 1, the channel 2, and the channel 3 during the time period T9 (i.e. respectively the control signal S10, the control signal S19, the control signal S19, and the control signal S10). The step of generating the evaluating results includes determining whether to adjust an evaluating result of a channel in the channel 0, the channel 1, the channel 2, and the channel 3 according to an actual type of a control signal transmitted via the channel and a target type corresponding to the control signal. The practical operation scheme about this part will be described in the following paragraphs in detail.

Please refer to FIG. 4. FIG. 4 is a simplified diagram illustrating a method for evaluating accuracy of the channel 0, the channel 1, the channel 2, and the channel 3 respectively in the Display Port system 100 according to an operation process of the Display Port system 100. As shown in FIG. 4, the actual types of the control signals respectively received via the channel 0, the channel 1, the channel 2, and the channel 3 during the time period T0 are all the control signals S1 and the target type corresponding to the control signals received via the four channels is also the control signal S1, and thus the evaluating results corresponding to the accuracy of the channel 0, the channel 1, the channel 2, and the channel 3 respectively during the time period T0 are all +1. The actual types of the control signals respectively received via the channel 0, the channel 1, the channel 2, and the channel 3 during the time period T1 are respectively the control signal S2, the control signal S11, the control signal S2, and the control signal S2, and the target type corresponding to the control signals received via the four channels is the control signal S2, and thus the evaluating results corresponding to the accuracy of the channel 0, the channel 2, and the channel 3 during the time period T1 will be adjusted to be +2, and the evaluating result corresponding to the accuracy of the channel 1 will remain as +1 of the time period T0. The actual types of the control signals respectively received via the channel 0, the channel 1, the channel 2, and the channel 3 during the time period T2 are respectively the control signal S3, the control signal S3, the control signal S12, and the control signal S3, and the target type corresponding to the control signals received via the four channels is the control signal S3, and thus the evaluating results corresponding to the accuracy of the channel 0, the channel 1, and the channel 3 during the time period T2 will be adjusted to be respectively +3, +2, and +3, and the evaluating result corresponding to the accuracy of the channel 2 will remain as +2 of the time period T1. The actual types of the control signals respectively received via the channel 0, the channel 1, the channel 2, and the channel 3 during the time period T3 are all the control signals S4 and the target type corresponding to the control signals received via the four channels is also the control signal S4, and thus the evaluating results corresponding to the accuracy of the channel 0, the channel 1, the channel 2, and the channel 3 respectively during the time period T3 will be adjusted to be respectively +4, +3, +3, and +4. The actual types of the control signals respectively received via the channel 0, the channel 1, the channel 2, and the channel 3 during the time period T4 are respectively the control signal S5, the control signal S13, the control signal S14, and the control signal S5, and the target type corresponding to the control signals received via the four channels is the control signal S5, and thus the evaluating results corresponding to the accuracy of the channel 0 and the channel 3 during the time period T4 will be both adjusted to be +5, and the evaluating result corresponding to the accuracy of the channel 1 and the channel 2 will remain as +3 of the time period T3. The actual types of the control signals respectively received via the channel 0, the channel 1, the channel 2, and the channel 3 during the time period T5 are respectively the control signal S6, the control signal S6, the control signal S15, and the control signal S6, and the target type corresponding to the control signals received via the four channels is the control signal S6, and thus the evaluating results corresponding to the accuracy of the channel 0, the channel 1, and the channel 3 during the time period T5 will be adjusted to be respectively +6, +4, and +6, and the evaluating result corresponding to the accuracy of the channel 2 will remain as +3 of the time period T4. The actual types of the control signals respectively received via the channel 0, the channel 1, the channel 2, and the channel 3 during the time period T6 are respectively the control signal S7, the control signal S7, the control signal S7, and the control signal S16, and the target type corresponding to the control signals received via the four channels is the control signal S7, and thus the evaluating results corresponding to the accuracy of the channel 0, the channel 1, and the channel 2 during the time period T6 will be adjusted to be respectively +7, +5, and +4, and the evaluating result corresponding to the accuracy of the channel 3 will remain as +6 of the time period T5. The actual types of the control signals respectively received via the channel 0, the channel 1, the channel 2, and the channel 3 during the time period T7 are respectively the control signal S8, the control signal S8, the control signal S17, and the control signal S8, and the target type corresponding to the control signals received via the four channels is the control signal S8, and thus the evaluating results corresponding to the accuracy of the channel 0, the channel 1, and the channel 3 during the time period T7 will be adjusted to be respectively +8, +6, and +7, and the evaluating result corresponding to the accuracy of the channel 2 will remain as +4 of the time period T6. The actual types of the control signals respectively received via the channel 0, the channel 1, the channel 2, and the channel 3 during the time period T8 are respectively the control signal S9, the control signal S9, the control signal S9, and the control signal S18, and the target type corresponding to the control signals received via the four channels is the control signal S9, and thus the evaluating results corresponding to the accuracy of the channel 0, the channel 1, and the channel 2 during the time period T8 will be adjusted to be respectively +9, +7, and +5, and the evaluating result corresponding to the accuracy of the channel 3 will remain as +7 of the time period T7. The actual types of the control signals respectively received via the channel 0, the channel 1, the channel 2, and the channel 3 during the time period T9 are respectively the control signal S10, the control signal S19, the control signal S19, and the control signal S10, and since the amount of the control signal S10 is equal to the amount of the control signal S19 at this time, thus the target type of the control signals respectively received via the channel 0, the channel 1, the channel 2, and the channel 3 during the time period T9 is not able to be determined by comparing the amount of the different types of the control signals. If a condition of the control signal S10 and the control signal S19 having the same priority occurs, the method of the present invention will additionally refer to the evaluating results mentioned above to know that the accuracy of the channel 0 and the channel 3 that select the control signal S10 (9+7=16) is higher than the accuracy of the channel 1 and the channel 2 that select the control signal S19 (7+5=12), and thus the method of the present invention can further determine the target type of the control signals respectively received via the channel 0, the channel 1, the channel 2, and the channel 3 during the time period T9 to be the control signal S10 selected via the channel 0 and the channel 3 according to the actual types of the control signals respectively received via the channel 0, the channel 1, the channel 2, and the channel 3 during the time period T9 (i.e. respectively the control signal S10, the control signal S19, the control signal S19, and the control signal S10). In addition, the evaluating results corresponding to the accuracy of the channel 0 and the channel 3 during the time period T9 will be both adjusted to be +10, and the evaluating result corresponding to the accuracy of the channel 1 and the channel 2 will remain as respectively +7 and +5 of the time period T8.

In addition, please note that the above embodiment is only for an illustrative purpose and is not meant to be a limitation of the present invention. For example, it is not necessary for the value representing the accuracy mentioned above to increase when the accuracy becomes higher. It is also practical to let the value representing the accuracy decrease when the accuracy becomes higher, and a smaller value will represent a higher accuracy for the evaluating result at this time. In a specific condition, this kind of scheme can reduce loading of a device (such as a counter) for generating the evaluating result, or prevent the device for generating the evaluating result from being out of function (for example, when the accumulated value is too high, the counter may be out of function).

Figure 5:
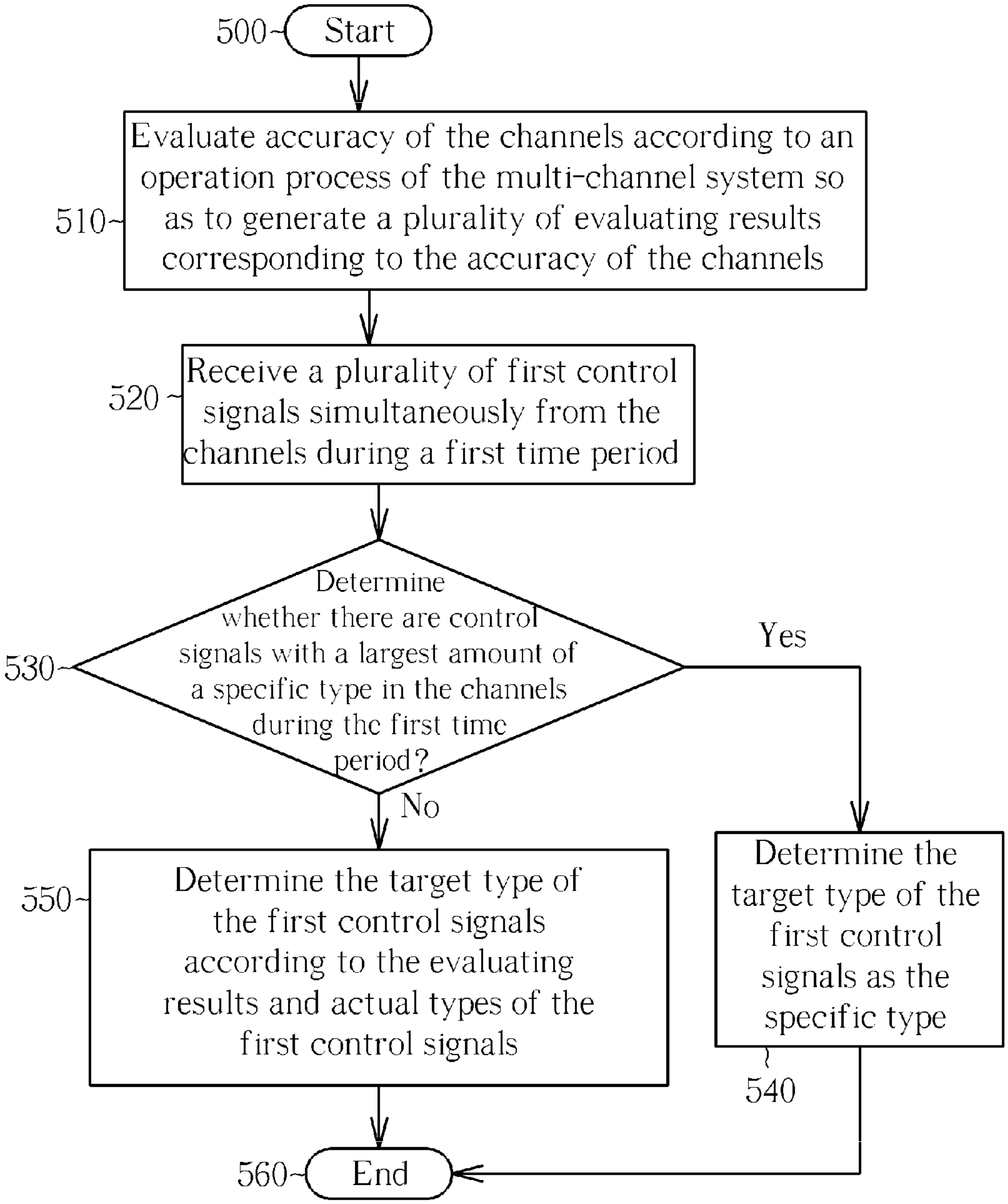
FIG. 5 is a flowchart showing a second embodiment of a method for determining a target type of a plurality of control signals respectively transmitted via a plurality of channels in a multi-channel system according to the operation scheme in the embodiment of the present invention.

Please refer to FIG. 5. FIG. 5 is a flowchart showing a second embodiment of a method for determining a target type of a plurality of control signals respectively transmitted via a plurality of channels in a multi-channel system according to the operation scheme in the above embodiment of the present invention. Provided that substantially the same result is achieved, the steps of the process flowchart need not be in the exact order shown and need not be contiguous, that is, other steps can be intermediate. The second embodiment of the method according to the present invention includes the following steps:

Step 500: Start.

Step 510: Evaluate accuracy of the channels according to an operation process of the multi-channel system so as to generate a plurality of evaluating results corresponding to the accuracy of the channels.

Step 520: Receive a plurality of first control signals simultaneously from the channels during a first time period.

Step 530: Determine whether there are control signals with a largest amount of a specific type in the channels during the first time period. If there are control signals with a largest amount of the specific type in the channels, then go to step 540; otherwise, go to step 550.

Step 540: Determine the target type of the first control signals as the specific type.

Step 550: Determine the target type of the first control signals according to the evaluating results and actual types of the first control signals.

Step 560: End.

About the step 510 of evaluating the accuracy of the channels according to an operation process of the multi-channel system so as to generate a plurality of evaluating results corresponding to the accuracy of the channels, the operation process of the multi-channel system indicates determining whether the actual types of the control signals respectively received via the channel 0, the channel 1, the channel 2, and the channel 3 (such as the control signal S2, the control signal S11, the control signal S2, and the control signal S2 during the time period T1) during any time period (such as the time period T0, the time period T1, the time period T2, the time period T3, the time period T4, the time period T5, the time period T6, the time period T7, the time period T8, or the time period T9) where the Display Port system 100 performs the operation is the same as the target type corresponding to the control signals respectively received via the channel 0, the channel 1, the channel 2, and the channel 3 (such as the control signal S2 during the time period T1). Next, the method of the present invention can evaluate the accuracy of the channel 0, the channel 1, the channel 2, and the channel 3 respectively according to the determining result of whether the actual types of the control signals respectively received via the channel 0, the channel 1, the channel 2, and the channel 3 is the same as the target type corresponding to the control signals respectively received via the channel 0, the channel 1, the channel 2, and the channel 3, so as to generate four evaluating results corresponding to the accuracy of the channel 0, the channel 1, the channel 2, and the channel 3 respectively (such as +2, +1, +2, and +2).

Please note herein that each of the above embodiments illustrates the method of the present invention by focusing on the control signals received by the Display Port system, however, this is only for an illustrative purpose and is not meant to be a limitation of the present invention. For example, the method of the present invention can also be applied to the multi-channel systems for Internet data transmission or the multi-channel systems for audio data transmission, etc.

In addition, please note that each of the above embodiments is only for an illustrative purpose and is not meant to be a limitation of the present invention. For example, other embodiments of the present invention can selectively use one of the above two methods for determining a target type of a plurality of control signals respectively transmitted via a plurality of channels in a multi-channel system, or use the above two methods in a different sequence according to the practical requirements of various multi-channel systems without departing from the spirit of the present invention.

Briefly summarized, the method disclosed by the present invention can use the data arrangement characteristics of various multi-channel systems to perform an optimization processing operation for the control signal priority of the various types of control signals when the multi-channel system operates during different time periods. In addition, the method disclosed by the present invention also can use the evaluating results corresponding to the accuracy of a plurality of channels during the operation process of the multi-channel system as the references so as to determine a target type of the control signal when there is a conflict occurring during the process of determining the various types of control signals via the plurality of channels. Thus, the method of the present invention can efficiently improve the system robustness and consistency of the various multi-channel systems.

Those skilled in the art will readily observe that numerous modifications and alterations of the device and method may be made while retaining the teachings of the invention.

What is claimed is:

1. A method for determining a target type of a plurality of control signals respectively transmitted via a plurality of channels in a multi-channel system, the method comprising:

utilizing the multi-channel system for receiving a plurality of first control signals from the channels during a first time period;

utilizing the multi-channel system for determining a control signal priority corresponding to the first time period according to a target type determined by actual types of a plurality of second control signals respectively transmitted via the channels during a second time period, wherein the second time period is prior to the first time period; and utilizing the multi-channel system for determining the target type of the first control signals according to the control signal priority and actual types of the first control signals.

2. The method of claim 1, further comprising:

determining whether there are control signals with a largest amount of a specific type in the channels during the first time period; and if there are control signals with the largest amount of the specific type in the channels, determining the target type of the first control signals to be the specific type.

3. The method of claim 2, further comprising:

if there are not control signals with the largest amount of the specific type in the channels, determining the control signal priority corresponding to the first time period according to a target type determined by actual types of a plurality of second control signals respectively transmitted via the channels during the second time period; and determining the target type of the first control signals according to the control signal priority and actual types of the first control signals.

4. The method of claim 1, wherein the multi-channel system is a Display Port system operating in a default mode.

5. The method of claim 4, wherein when the target type determined by the second control signals is a blanking area start (BS) control signal, a secondary data packet end (SE) control signal, a scrambler reset (SR) control signal, a content protection blanking area start (CPBS) control signal, or a content protection scrambler reset (CPSR) control signal, then a secondary data packet start (SS) control signal and a blanking area end (BE) control signal respectively have a higher priority than the other types of control signals in the control signal priority.

6. The method of claim 4, wherein when the target type determined by the second control signals is a BE control signal or a fill end (FE) control signal, then a BS control signal, a fill start (FS) control signal, the FE control signal, an SR control signal, a CPBS control signal, and a CPSR control signal respectively have a higher priority than the other types of control signals in the control signal priority.

7. The method of claim 4, wherein when the target type determined by the second control signals is an FS control signal, then an FE control signal has a higher priority than the other types of control signals in the control signal priority.

8. The method of claim 4, wherein when the target type determined by the second control signals is an SS control signal, then the SS control signal and an SE control signal respectively have a higher priority than the other types of control signals in the control signal priority.

9. The method of claim 1, wherein the multi-channel system is a Display Port system operating in an enhanced mode.

10. The method of claim 9, wherein when the target type determined by the second control signals is a BS control signal, then a CPSR control signal, an SS control signal, and a BE control signal respectively have a higher priority than the other types of control signals in the control signal priority.

11. The method of claim 9, wherein when the target type determined by the second control signals is a BE control signal or an FE control signal, then a BS control signal, an FS control signal, the FE control signal, and an SR control signal respectively have a higher priority than the other types of control signals in the control signal priority.

12. The method of claim 9, wherein when the target type determined by the second control signals is an FS control signal, then an FE control signal has a higher priority than the other types of control signals in the control signal priority.

13. The method of claim 9, wherein when the target type determined by the second control signals is an SS control signal, then the SS control signal and an SE control signal respectively have a higher priority than the other types of control signals in the control signal priority.

14. The method of claim 9, wherein when the target type determined by the second control signals is an SE control signal, then an SS control signal and a BE control signal respectively have a higher priority than the other types of control signals in the control signal priority.

15. The method of claim 9, wherein when the target type determined by the second control signals is an SR control signal, then a CPSR control signal, a CPBS control signal, an SS control signal, and a BE control signal respectively have a higher priority than the other types of control signals in the control signal priority.

16. The method of claim 9, wherein when the target type determined by the second control signals is a CPBS control signal, then a BS control signal, an SR control signal, and the CPBS control signal respectively have a higher priority than the other types of control signals in the control signal priority.

17. The method of claim 9, wherein when the target type determined by the second control signals is a CPSR control signal, then a BS control signal, an SR control signal, and the CPSR control signal respectively have a higher priority than the other types of control signals in the control signal priority.

18. The method of claim 1, further comprising:

evaluating accuracy of the channels according to an operation process of the multi-channel system to generate a plurality of evaluating results corresponding to the accuracy of the channels.

19. The method of claim 18, further comprising:

determining the target type of the first control signals according to the evaluating results, the control signal priority, and the actual types of the first control signals.

20. The method of claim 19, wherein the step of generating the evaluating results comprises:

determining whether to adjust an evaluating result of a channel in the channels according to an actual type of a control signal transmitted via the channel and a target type corresponding to the control signal.

21. A method for determining a target type of a plurality of control signals respectively transmitted via a plurality of channels in a multi-channel system, the method comprising:

utilizing the multi-channel system for evaluating accuracy of the channels according to an operation process of the multi-channel system to generate a plurality of evaluating results corresponding to the accuracy of the channels;

utilizing the multi-channel system for receiving a plurality of first control signals simultaneously from the channels during a specific time period; and utilizing the multi-channel system for determining the target type of the first control signals according to the evaluating results and actual types of the first control signals.

22. The method of claim 21, wherein the step of generating the evaluating results comprises:

determining whether to adjust an evaluating result of a channel in the channels according to an actual type of a control signal transmitted via the channel and a target type corresponding to the control signal.

23. The method of claim 21, further comprising:

determining whether there are control signals with a largest amount of a specific type in the channels during the specific period;

if there are the control signals with the largest amount of the specific type in the channels, determining the target type of the first control signals to be the specific type; and if there are not the control signals with the largest amount of the specific type in the channels, determining the target type of the first control signals according to the evaluating results and the actual types of the first control signals.

24. A method for determining a target type of a plurality of control signals transmitted in a multi-channel system, the multi-channel system comprising a plurality of channels, the method comprising:

utilizing the multi-channel system for evaluating accuracy of the channels according to a predetermined evaluating scheme to generate a plurality of evaluating results corresponding to the accuracy of the channels;

utilizing the multi-channel system for receiving a plurality of first control signals simultaneously from the channels during a first time period; and utilizing the multi-channel system for determining the target type of the first control signals according to the evaluating results and actual types of the first control signals.

25. The method of claim 24, wherein the step of generating the evaluating results comprises:

determining a control signal priority corresponding to the first time period according to a target type of a plurality of second control signals, wherein the evaluating results comprises the control signal priority; and determining the target type of the first control signals according to the control signal priority and the actual types of the first control signals.

26. The method of claim 25, further comprising:

generating the target type of the second control signals according to the actual types of the second control signals respectively transmitted via the channels during a second time period.

27. The method of claim 26, wherein the second time period is prior to the first time period.

* * * * *